Aug. 21, 1973

R. V. BRAUN 3,753,844

COMPRESSIVELY DEFORMED CELLULOSIC LAMINATES WITH
IMPROVED DRAPE, BULK, AND SOFTNESS

Filed May 20, 1971

INVENTOR.
RALPH V. BRAUN
BY
Wolfe, Hubbard, Leydig, Voit & Osann, Ltd.
ATTORNEYS.

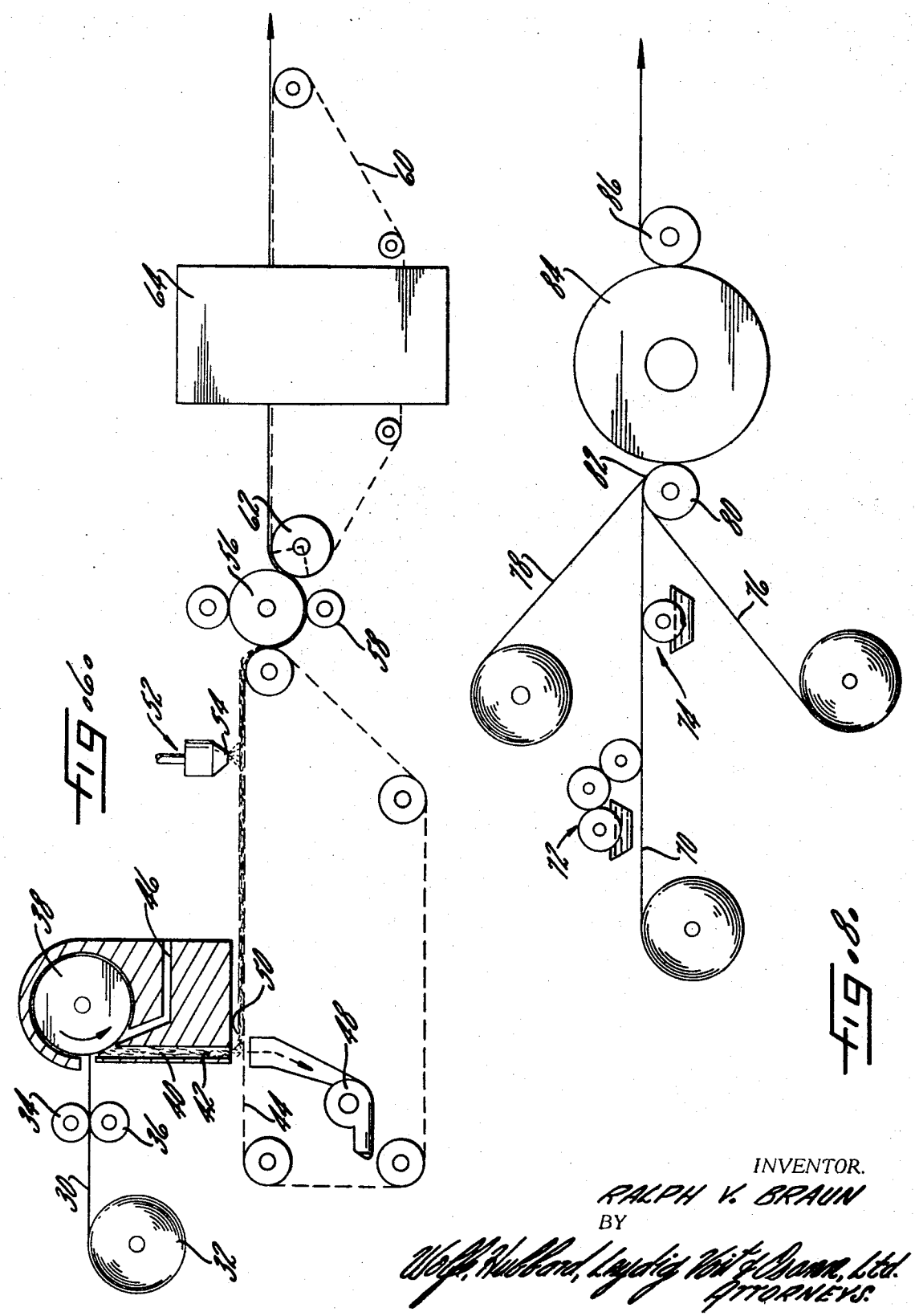

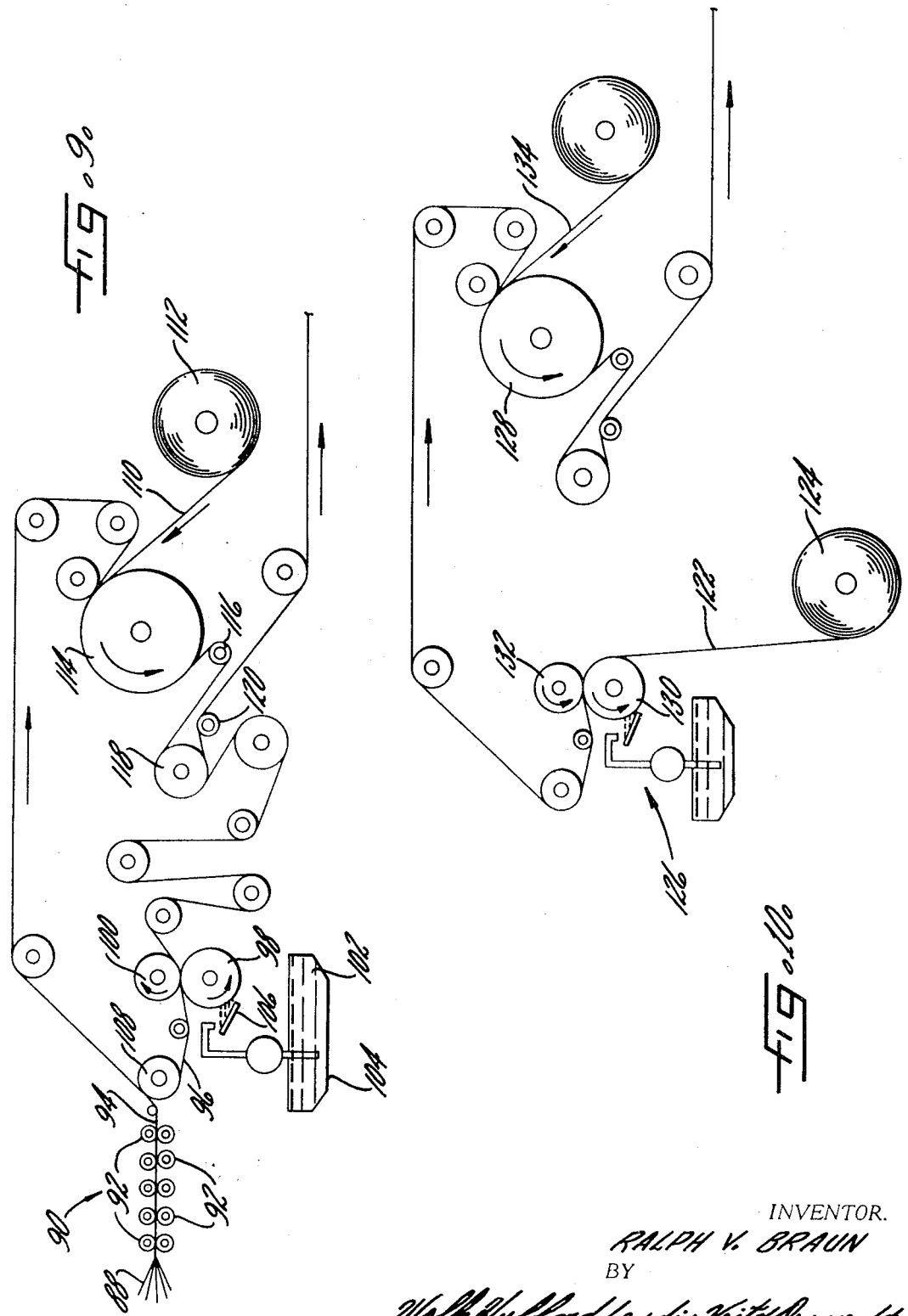

United States Patent Office 3,753,844
Patented Aug. 21, 1973

3,753,844
COMPRESSIVELY DEFORMED CELLULOSIC LAMINATES WITH IMPROVED DRAPE, BULK, AND SOFTNESS
Ralph V. Braun, Neenah, Wis., assignor to Kimberly-Clark Corporation, Neenah, Wis.
Filed May 20, 1971, Ser. No. 145,210
Int. Cl. B32b 5/12
U.S. Cl. 161—57                                    12 Claims

ABSTRACT OF THE DISCLOSURE

A soft, bulky cellulosic laminate is illustrated. The laminate comprises an airlaid web of cellulosic fibers containing a pattern of highly compacted spot-bonded areas and fluffy mound regions of substantially unbonded fibers disposed between the bonded areas. The cellulosic web is united to a network of reinforcing elements, such as a scrim, drafted fiber web, or continuous filament web, with a layer of patterned adhesive containing open areas of a magnitude at least several times greater than the spacings between the spot bond areas in the cellulosic web. The laminate is compressively deformed, such as by microcreping, to enhance softness and bulkiness by accentuating the unbonded and fluffy characteristics of the mounds in the cellulosic webs which are disposed within the opened areas of the adhesive layer.

RELATED APPLICATIONS

Charles E. Dunning application entitled "Air-Formed Web of Bonded Pulp Fibers," Ser. No. 882,257, filed Dec. 4, 1969, now U.S. Pat. 3,692,622; and Charles E. Dunning application entitled "Improved Laminates" Ser. No. 145,545, filed on even date herewith.

BACKGROUND OF THE INVENTION

The present invention relates to cellulosic laminates and, more particularly, to soft cellulosic laminates with desirable textile-like characteristics.

Laminates containing creped cellulose wadding reinforced with scrim-like materials or fibrous webs have become increasingly popular in recent years for disposable uses such as garments, bedsheets, wipes, etc. The attractiveness of using such laminates is due, in part, to their inexpensiveness. The wadding constituent provides a desirable product opacity and absorbency while product strength is obtained by means of the reinforcing member. For many uses, the laminates are also treated with fire retardants and/or water repellents which are generally applied from aqueous mediums.

Since many laminate uses require a desirable textile-like feel, it is conventional practice to prepare the laminates in a manner which preserves the basic drapeability of the cellulosic web and/or to mechanically treat the laminate in order to enhance its bulk and texture. Thus, product bulk is ordinarily increased by employing several plies of creped wadding and/or mechanically deforming the laminate such as by embossing. Similarly, the drapeability can be enhanced by bonding the reinforcing webs to the creped wadding only at spaced points in the wadding.

While the bulk and other desirable textile-like characteristics of cellulosic laminates can be enhanced in manners such as those above-described, the realization of optimum properties is limited due to the fact that conventional water-formed cellulosic wadding is employed. Due to the initial overall bonding which occurs in the preparation of such wadding, it is very difficult to achive truly textile-like laminates. In generally, experience has proven that even with extensive mechanical deformation of the wadding prior to lamination or of the laminate itself, it is very difficult to disrupt sufficient fiber bonding so as to provide a product which does not have a characteristic paper-like feel. Moreover, while it has been observed that bulk and drapeability of conventionally prepared laminates can be improved by mechanical working, it is frequently the case that the resulting laminate surfaces have a harsh feel. When it is desired to treat the laminates with fire retardants and/or water repellents, the problem of obtaining a desirable fabric-like product becomes even more difficult.

Accordingly, it is a principal object of the present invention to provide reinforced cellulosic web laminates possessing desirable textile-like bulk and drape and an aesthetically pleasing soft feel.

A related and more specific object lies in providing laminates having the characteristics set forth in the principal object which also possess a desirable degree of elasticity.

An additional object is to provide laminates which, in addition to possessing the aforementioned attributes, also exhibit highly desirable absorbency characteristics.

Still a further object resides in providing reinforced cellulosic web laminates which exhibit enhanced water repellency and/or fire retardancy and which, in addition, possess the aforementioned characteristics of a desirable textile-like bulk and drape and an aesthetically pleasing soft feel.

Yet another object is to provide reinforced cellulosic web laminates having the desirable characteristics set forth above and which can be fashioned with functionally desirable surface characteristics such as enhanced abrasion resistance.

A specific object of the present invention resides in providing laminates of a cellulosic web and a bonded web of substantially randomly deposited and continuous thermoplastic filaments which exhibit outstanding fabric-like characteristics.

Other objects and advantages of the present invention will become apparent as the following description proceeds, taken in conjunction with the accompanying drawings in which:

FIG. 6 is a schematic view illustrating apparatus for forming a cellulosic web useful in preparing laminates of the present invention;

FIG. 7 is a schematic view showing a portion of the cellulosic web prepared by the apparatus of FIG. 6 and illustrating its fluffy, mound-like configuration; and FIGS. 8–10 are schematic views illustrating apparatus for initially forming laminates useful in the present invention.

Figure 1:
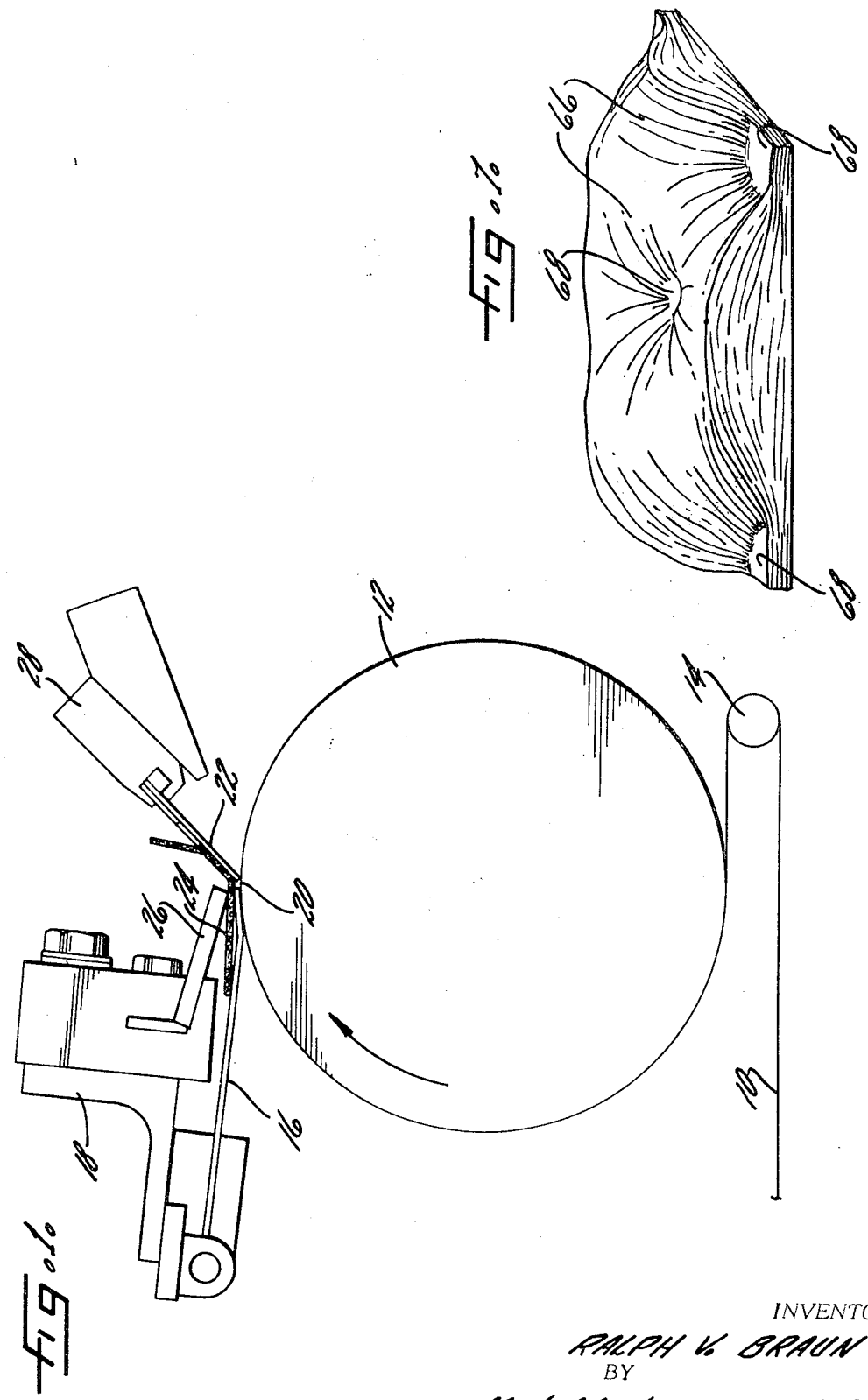
FIG. 1 is a schematic view illustrating apparatus useful for compressively deforming laminates.
Figure 2:
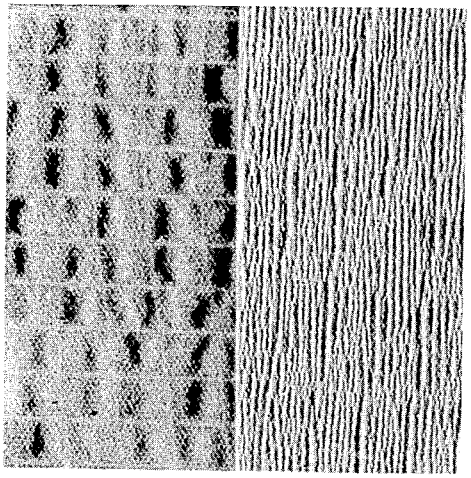
FIG. 2 is a photograph illustrating a laminate before and after microcreping.
Figure 3:
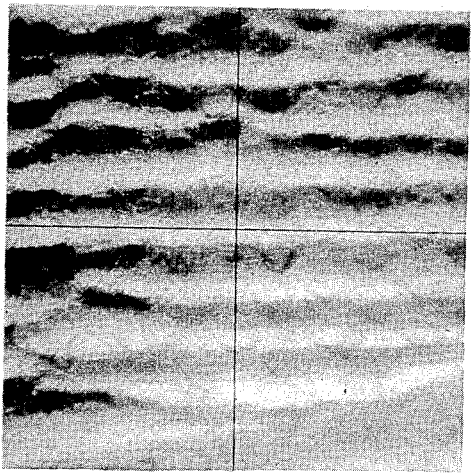
FIG. 3 is a photomicrograph taken at 10.5× magnification of the microcreped laminate shown in FIG. 2.

While the invention is susceptible of various modifications and alternative constructions, there is shown in the drawings and will herein be described in detail the preferred embodiments. It is to be understood, however, that it is not intended to limit the invention to the specific forms disclosed. On the contrary, it is intended to cover all modifications and alternative constructions falling within the spirit and scope of the invention as expressed in the appended claims.

As illustrated herein, products having a desirable textile-like bulk and drape and an aesthetically pleasing soft feel can be prepared by compressively deforming a laminate containing a spot bonded airlaid web of cellulosic fibers which is united to a network of reinforcing elements with an open layer of patterned adhesive. Compressive deformation of the laminate can be accomplished by well known techniques such as microcreping and is to be distinguished from conventional stretching techniques which involve tensional forces such as embossing. Due to the only spot bonded character of the cellulosic web, compressive deformation of the laminate in the manner illustrated herein is believed to result in a general loosening and fluffing of the web in those regions between adhesive attachment. The remarkably soft feel and other desirable attributes of the product are believed to be attributable to such loosening and fluffing of the random-laid web. Moreover, the illustrated compressive deformation does not adversely affect the overall integrity of the web nor result in excessive disruption of the spot bonds. Thus, the compressively deformed laminates have a desirable overall uniform appearance and do not exhibit excessive surface linting.

Turning now to the drawings, FIG. 1 illustrates one manner in which compressive deformation can be accomplished. The illustrated method involves microcreping. As shown, a laminate 10 prepared as hereinafter discussed in detail is forced against the surface of a rotating drum 12 by passage over the idler roll 14. Thereafter, microcreping of the laminate is accomplished by passing the laminate between the flexible blade 16 (which has been forced by means of pressure applied to the assembly 18 into conformity with the drum surface over a portion of its length) and the drum 12 and into the pocket 20 formed between the end of the blade 16, the rigid creping blade 22, and the flexible blade 24. The rigid bar 26 assures that a tight pocket 20 is formed by forcing the flexible blade 24 into contact with the top edge of the blade 16 at its extremity and with the creping blade 22 along a terminal portion of its length. Microcreping of the laminate occurs in the pocket 20 and the fineness of the crepe can be controlled by moving the assembly 28 holding the rigid creping blade 22 closer to or farther away from the end of the blade 16. Customarily the surface of the drum 12 is roughened to promote non-slipping transfer of the laminate through the pocket. The illustarted microcreping technique is a well known operation and suitable microcreping equipment is available from Bird Walton Corporation.

In order to realize the advantages of the present invention which are derivable from the illustrated compressive deformation, it is important that the cellulosic web included in the laminate does not possess the characteristic overall fiber bonding present in conventional waterlaid sheets. On the other hand, some fiber bonding is necessary in order to permit handling of the cellulosic web during lamination and to provide a finished product wherein the cellulosic fibers are held together so as to minimize product linting. An airlaid web of wood pulp fibers which are united into a coherent structure by means of a regular pattern of spot bonds spaced less than an average fiber length apart has been found to be useful in the present invention. While the overall area of fiber bonding in such webs may not differ substantially from that present in conventional waterlaid webs, the distinctive character of such bonding wherein substantial areas of unbonded fibers are present is thought to directly contribute to the desirable aesthetic characteristics obtainable by compressive deformation according to the present invention.

It is believed that the distinctive construction of the cellulosic web permits the forces accompanying compressive deformation to operate in a manner which accentuates the basic bulkiness and softness of the cellulosic web. Thus, whereas with respect to conventional waterlaid cellulosic materials the energy accompanying microcreping is substantially expended in the breakage of cellulosic fiber bonds, with respect to the present laminates little bond breakage is believed to occur. Thus, the microcreping energy can be directly utilized in increasing laminate bulk and in uncompacting and fluffing up the cellulosic web.

The photomicrographs set forth in FIGS. 2–5 visually illustrate the distinctive character of microcreped laminates according to the present invention. The left hand side of the FIG. 2 photograph shows an airlaid spot bonded cellulosic web laminate reinforced with a scrim material prior to microcreping. The spot bonds in the cellulosic web are clearly apparent as is the underlying scrim material. The right hand portion of the FIG. 2 photograph shows this same laminate after microcreping with the crepe folds being clearly evident. The FIG. 3 photograph is a greatly enlarged view of a portion of the microcreped laminate of FIG. 2. Close visual inspection of this microcreped laminate reveals the existing presence of the spot bonds in the cellulosic web. The generally bulky texture of the cellulosic web surface is also apparent from this photograph.

Figure 4:
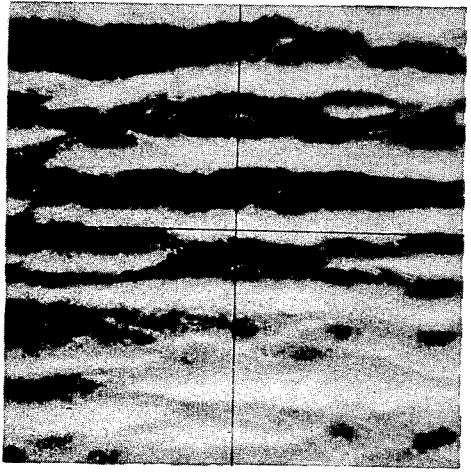
FIGS. 4 and 5 are photomicrographs taken at 10.5× magnification illustrating a microcreped laminate of the present invention and a conventional microcreped laminate, respectively.
Figure 5:
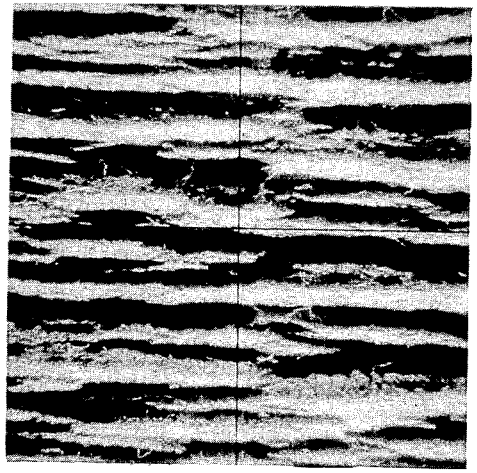

Turning to FIG. 4, the photograph therein reproduced is also of a microcreped laminate prepared according to the present invention. The surface characteristics of this laminate are to be compared with that shown in FIG. 5 which is a photograph of a microcreped laminate similar to that depicted in FIG. 4 except that conventional waterlaid tissue was employed as the cellulosic constituent. The light source used for the FIGS. 4 and 5 photos was disposed at an angle to the laminate surfaces so as to emphasize the particular microcreped structures of the laminates. The more pronounced shadowing present in the FIG. 5 photograph highlights the increased pointedness of the crepe peaks in microcreped waterlaid tissue laminates. Such pointedness is believed to contribute to the somewhat harsh feel of such conventional laminates. In contrast thereto, the FIG. 4 photograph illustrates that crepe peaks in laminates of the present invention are much less pronounced, being more rounded and fluffy in construction. Such is believed to account for the generally softer and bulkier feel of laminates prepared according to the present invention.

Apart from the use of the above-discussed distinctive cellulosic web, the preparation of laminates useful herein can be accomplished according to generally well known techniques. As indicated previously, and as will hereinafter be specifically illustrated, a variety of networks of reinforcing elements (i.e., the reinforcing means) can be used. The particular requirements of the reinforcing means are that it provide adequate strength for the intended product end-use and that it not detract from the realization of the desirable product attributes obtainable by means of the indicated compressive deformation. Thus, the reinforcing means should be flexible and capable of being deformed when subjected to compressive forces. Furthermore, where product elasticity is desired, the reinforcing means should be resilient and capable of holding a compressive set to some degree. However, it should be understood that the above-discussed product attributes regarding bulk, softness, and the like are due principally to the deformation of the cellulosic web. Accordingly, so long as the reinforcing means can be initially compressively deformed, the ability to hold such deformation is not essential to the present invention in its broadest aspects. Suitable reinforcing means, include, for example, scrim-like materials, drafted or carded fibrous webs, webs of substantially randomly deposited continuous filaments of a thermoplastic polymer, etc.

Ply attachment between the cellulosic web and the reinforcing means should be achieved with a layer of patterned adhesive so as not to produce an unduly stiff laminate. With respect to scrim reinforcing means, such patterned adhesive attachment can be obtained by simply applying adhesive to the scrim threads since the scrim itself is of open construction. With other reinforcing means adhesive printing can be accomplished in discontinuous fashions such as by line or brick applications. In order to realize the advantage of the present invention, the adhesive pattern selected should contain open areas of a magnitude at least several times greater than the spacing between adjacent spot bonds in the cellulosic web.

The type of adhesive is not particularly critical. Advantages reside in the use of plastisols which are colloidal dispersions of synthetic resins in a suitable organic ester plasticizer, and which, under the influence of heat, provide good binding power while remaining soft and flexible. While many adhesives of this type are known, those found particularly useful for incorporation include vinyl chloride polymers and copolymers of vinyl chloride with other vinyl resins, plasticized by organic phthalates, sebacates or adipates. These provide a fast curing plastisol adhesive characterized by relatively low viscosity, low migration tendency, and minimum volatility. Such adhesives remain soft and flexible after curing, and can be reactivated by subsequent heating. Types of adhesives other than plastisols such as latexes, (e.g., acetate/ethylene copolymer emulsions, acrylonitrile-butadiene emulsions) and solvent based adhesives such as polyvinyl acetates dissolved in a solvent such as acetone can also be employed. Ordinarily, the adhesive occupies less than about 25% of the surface area of the cellulosic web and preferably less than about 15%. Since, as opposed to conventional creped, waterlaid cellulosic webs, the cellulosic webs useful herein do not possess a high degree of elongation, it is preferable to initially apply the adhesive used for ply attachment onto the reinforcing means rather than the cellulosic web itself.

After initial preparation of the laminate which, as has been indicated, can be accomplished by known techniques, the laminate is subjected to compressive deformation, one means for accomplishing such having been previously discussed with respect to FIG. 1. Where it is desirable to provide a laminate with increased water repellency and/or fire retardancy, such is generally accomplished prior to the indicated compressive deformation. As is well known, water-repellent and/or fire retardant ingredients are ordinarily applied to cellulosic laminates from aqueous mediums. Customarily, such treatments tend to stiffen the laminates necessitating subsequent softening techniques which, with presently available laminates, are at best only moderately successful in improving product feel. Quite unexpectedly, it has been found that the illustrated compressive deformation of the laminates containing spot bonded airlaid webs which have been treated with fire retardants and/or water repellents produces a product with a surprising textile-like quality. Thus, the present invention is believed to be uniquely applicable to the preparation of soft, drapeable, bulky laminates wherein enhanced fire retardancy and/or water repellency are desired.

The following examples illustrate the present invention. Example I illustrates one manner of preparing a cellulosic web useful in the present invention. The remaining examples illustrate the preparation of specifically useful laminates employing a cellulosic web prepared as described in Example I.

EXAMPLE I

With reference to FIG. 6, a cellulosic web is formed by initially separating a pulp sheet 30 into its individual fibers 40 by unwinding the pulp sheet 30 from a roll 32 and forwarding the sheet by means of the driven rolls 34, 36 to a divellicating means such as a picker roll 38, powered by means not shown. The individual fibers 40 are conveyed through a forming duct 42 and onto a moving foraminous wire 44. Air from a source 46 in combination with a vacuum box 48 creates a downwardly moving stream of air which assists in collecting the air formed web 50 on the foraminous wire.

While customary air forming techniques can be utilized in forming the web, the forming duct 42 illustrated in FIG. 6 is particularly efficient in obtaining an especially suitable web, particularly at high speeds. The illustrated duct has a width approximately equal to the height of the picker teeth on the roll 38 and is positioned so as to tangentially receive the fibers as they leave the picker. By using a duct with such a width, fiber velocity can be maintained essentially constant throughout the length of the duct. Webs formed in this manner have exceptionally good uniformity and are substantially free of fiber floccing. Appropriate sizing of the forming duct and the spatial arrangement with respect to the picker and the wire are completely described in copending Appel application Ser. No. 882,265, now U.S. Pat. 3,606,175 filed on Dec. 4, 1969, entitled, "Pulp Picking Apparatus with Improved Fiber Forming Duct."

The weight of the airlaid web formed in the above-illustrated manner is dependent upon the desired end-use of the subsequently prepared laminates. For most applications, however, webs having a basis weight of about 10–25 lbs. per 2880 ft.$^2$ are suitable. The particular type of cellulosic fibers used in preparing the web is also not critical and the type selected will generally depend upon the desired surface texture. For example, webs with a soft and fluffy texture are generally obtained from cedar fibers while a slightly more wooly texture with increased body can be obtained from southern pine fibers. However, as is more completely described in the aforementioned Dunning application, Ser. No. 882,257 and now U.S. Pat. 3,692,622, the cellulosic fibers used herein generally have a length of less than ½ inch. More particularly, the fibers in the pulps described above have a length distribution of about 1–5 mm.

Referring again to FIG. 6, after formation on the foraminous wire 44, the web 50 is then forwarded to a moisturizing station 52 where the moisture content of the web is raised to a level which is satisfactory for bonding the web as will be hereinafter described. Accordingly, the web 50 is forwarded below a water spray which can comprise a nozzle 54 capable of emitting a generally uniform spray. On leaving the moisturizing station 52, the web desirably has a moisture content of about 15–40%, based on the weight of the wetted web.

After wetting, the web is transferred from the wire 44 to a transfer roll 56 by passing the wetted web through a nip formed between the wire 44 and the transfer roll 56. Successful transfer of the web to the roll 56 depends on the existence of a moisture gradient between the opposed surfaces of the web, with the higher moisture content being present on the surface which contacts the transfer roll. To this end, the width of the nip should desirably be less than the thickness of the web entering the nip.

After transfer of the web to the roll 56, bonding of the web is accomplished by passing the web through a nip formed between the transfer roll 56 and the patterned steel roll 58 containing a plurality of raised points. The pattern of the raised points on the roll 58 is not particularly important although this can, to some extent, influence the directional strength characteristics of the bonded web. To avoid significant compaction of the web in other than those areas to be specifically bonded, the sides of the raised points are desirably comparatively steep with heights of about 0.015–0.030 being particularly useful. The pressure applied at the raised points should be sufficient to cause the airlaid fibers to be bonded together so as to form a coherent structure. Typically the pressure exerted on the individual points will be at least about 2,000 p.s.i. and be sufficient to decrease the thickness of the web in the bonded areas to about 40% of the unbonded areas and desirably about 20%.

The total bonded area and the bond frequency may of course be varied by the selection of the raised point pattern on the roll 56. Since the webs are to be combined with a suitable reinforcing means, large bond areas and close bond frequencies are not required and, in fact, are not desirable. Total bond areas of about 10–40%, and bond frequencies on the order of about 10–40 per inch across both dimensions of the web can be employed.

After bonding, the web is removed from the transfer roll 58 and onto a moving wire 60 by means of the suction roll 62. Thereafter, the web is dried by passage through a through dryer 64. The use of a through dryer retains, and perhaps even enhances the lofty, three dimensional nature of the web. After drying, the web can be directly laminated in the manner hereinafter described or wound-up for future use.

As illustrated in FIG. 7 the web prepared as above described is characterized by a continuum of randomly oriented fibers 66 interrupted by a pattern of highly compacted spot bonded areas 68 spaced less than an average fiber length apart. A cross-sectional view taken along a row of the bonded area shows that the bonded areas are alternately interrupted by fluffy mounds of substantially unbonded fibers. The fact that substantially no bonding is present in the mound area is due to the absence of strong surface tension forces which normally develop between fibers in waterlaid processes when the water is removed.

The preparation of cellulosic webs in the manner described with reference to FIG. 6 is more completely shown in the above-identified Dunning application Ser. No. 882,257, now U.S. Pat. 3,692,622 and in copending applications, filed on even date herewith entitled, "Apparatus For Forming Airlaid Webs," Ser. No. 145,452 and "A Method of Forming a Lightweight Airlaid Web of Wood Fibers," Ser. No. 145,546.

The following examples illustrate the preparation of compressively deformed laminates in accordance with the present invention using a variety of different reinforcing means. The cellulosic webs employed in these laminates are prepared in the basic manner described above with reference to FIG. 6. The webs are prepared from northern soft wood bleached kraft fiber pulp sheets. The webs are bonded by means of a plurality of spot hydrogen bonds which occupy about 25% of the web surface area and are disposed in a density of about 25 bonds/in. in both web directions.

EXAMPLE II

This example illustrates the preparation of a laminate containing outer plies of cellulosic webs such as above-identified with each web having a basis weight of about 14 lbs./2880 ft.$^2$ and a single, inner nonwoven scrim reinforcing ply (nylon threads of 30 denier-12 per inch in machine direction, 70 denier-5 per inch in cross direction). As is well known, such nonwoven scrim reinforcing plies comprise a set of spaced warp or machine direction threads and a set of spaced fill or cross-direction threads. The two sets of threads, disposed in a face-to-face relation to each other are adhesively bonded together where the threads of one set cross the threads of the other set. A variety of means are known preparing such scrim materials, one desirable method being shown in U.S. Pat. 2,841,202 to H. W. Hirschy.

Turning to FIG. 8, the laminate of the present example is prepared by applying an adhesive to both sides of the scrim 70 at the printing stations 72 and 74 and thereafter bringing the adhesively coated scrim into contact with the cellulosic webs 76 and 78 at the squeeze roll 80 to form the unbonded laminate 82. Bonding of the laminate is then accomplished by passing the laminate 82 through the nip formed between the squeeze roll 80 and the hot roll 84 and then subsequently conveying the laminate on the surface of the hot roll until it is removed therefrom over the calender roll 86. The nip pressure between the squeeze roll 80 and the hot roll 84 should be sufficient to cause the adhesive applied to the scrim at the stations 72 and 74 to penetrate into the cellulosic webs. The dwell time of the laminate on the hot roll 84 (as influenced by laminate speed and amount of wrap between rolls 80 and 86) should be sufficient to effectuate curing of the adhesive.

The following laminating conditions are useful for preparing a scrim reinforced laminate with the previously identified scrim and cellulosic webs:

Adhesive: Plastisol (100 parts vinyl chloride polymer, 60 parts dioctyl phthalate plasticizer, 25 part mineral spirits); application viscosity 600 cps.; applied in amounts of about 6 grms./yd.$^2$ to each side of scrim.

Squeeze roll pressure: 40 p.l.i.
Roll 84 temperature: 350° F.
Laminate dwell time on roll 84: about 1 sec.
Calender roll 86 pressure: 200 p.l.i.

After preparation as described above, the laminate was microcreped using apparatus similar to that shown in FIG. 1 with the microcreping conditions being selected so as to produce a desirable creped appearance without noticeable surface degradation of the laminate itself.

The laminate prepared by the above-illustrated procedure is extremely soft and drapeable and, in particular, possesses a very soft surface with the almost complete absence of customary paper-like characteristics. In addition, the laminate possesses a desirable elastic quality and exhibits an elongation of about 15–20% before noticeable failure is evident. The laminate is strong and attractive in appearance and readily absorbs and holds water. The laminate is quite suitable for uses such as wipes, garment materials, sheeting, and drapery.

In further illustration of the present invention, the procedure set forth above with respect to the preparation of the scrim reinforced laminate is repeated except that prior to the microcreping operation, the laminate is treated for water repellency and fire retardancy. Such is accomplished by passing the laminate formed by the manner illustrated in FIG. 8 through an aqueous bath containing fluorocarbons and fire retardant salts. The bath also can contain an abrasion resistance promoting polymer. After passage through the bath, excess water can be removed from the laminate by passage through squeeze rolls and the laminate thereafter dried on steam heated rolls. Subsequently, the treated laminate can be microcreped in the manner discussed above.

Even though the laminate is subjected to overall wetting in the treatment bath and is somewhat stiff prior to microcreping, the compressively deformed laminate exhibits a surprising textile-like quality and softness. Thus microcreping of laminates containing spot bonded airlaid cellulosic webs is remarkedly efficient in improving drape and softness. In contrast, even after microcreping, conventional laminates still exhibit a noticeable papery feel.

While the present example illustrates the use of a particular scrim material in forming a reinforced cellulosic web laminate, it should be apparent that a variety of scrim materials are similarly useful. Thus, in addition to the illustrated nonwoven scrim, woven scrims can also be employed. Similarly, scrims prepared from materials other than nylon such as rayon, polyester, and the like are similarly useful. Ordinarily, the scrim threads will be either mono-filament or multi-filament yarns having a denier of about 15–100 or perhaps even higher, e.g., up to 400, with the particular warp and fill threads being present in about 1–12 threads per inch.

EXAMPLE III

This example illustrates the preparation of a two ply laminate wherein the reinforcing ply is a web of highly drafted fibers. With reference to FIG. 9, the laminate is initially formed by passing multiple slivers 88 of textile fibers into a draw frame 90 which comprises a series of pairs of grooved rolls 92, the rolls of each pair being driven by appropriate gearing (not shown, but well known to those skilled in the art) at a peripheral rate of speed somewhat faster than the rate of operation of the preceding pair. Merely by way of example, the pairs of rolls 92 may be adjusted to provide an overall increase in speed and, therefore, an extent of fiber draw on the order of 15:1 through the draw frame 90. As the juxtaposed slivers pass through draw frame 90, the individual fibers are drafted and spread out to form a flat, striated web 94 of substantially aligned fibers which can desirably have a basis weight of about 3–10 grms./yd.$^2$. Web 94 is maintained adjacent a supporting conveyor sheet 96.

The conveyor sheet 96 can comprise an endless conveyor belt treated on at least its upper surface with a release agent. One example of such a belt is woven glass fiber with a surface coating of tetrafluoroethylene resin. Other examples of release coatings are well known, and include such materials as silicones, fatty acid metal complexes, certain acrylic polymers and the like. Heat resistant films or thin metal sheets treated with release agents can also be used as the carrier sheet.

Prior to the time the web 94 is picked up by the belt 96, the latter has imprinted on its release-treated surface an open pattern of adhesive. Adhesive printing is accomplished by feeding the belt 96 through the nip formed between a printing roll 98 and a back-uproll 100 maintained in very light pressure engagement. The surface of printing roll 98 is provided with a preselected intaglio pattern to which adhesive can be supplied in various ways well known to those skilled in the art. As illustrated, adhesive 102 from a supply pan 104 is pumped or otherwise transferred to a reservoir located immediately above an inclined doctor blade 106—the reservoir being defined in part by the upper surface of the inclined doctor blade and the adjacent portion of the rotating periphery of the surface of the printing roll 98. As the printing roll 98 rotates (in a counterclockwise direction as viewed in FIG. 9), the intaglio patterned surface thereof is filled with adhesive 102, excess adhesive is removed by the dotor blade 106, and a metered amount of adhesive is then transferred to the release coated belt 96 in the preselected pattern. It will be understood that, as shown in FIG. 9, the adhesive is actually on the underside of belt 96 which becomes the upper surface after passing around roll 108, at which time the adhesive pattern directly contacts the fiber web 94.

The particular dimensions of the intaglio pattern employed and, indeed, the actual pattern itself, are not critical. Good results have been achieved where a diamond pattern was employed in which adjacent lines of adhesive are spaced apart in both directions by about ¼ inch, and wherein the intaglio printing roll 98 has adhesive cells or lines 0.007 inch deep and 0.025 inch wide.

Since the surface of belt 96 is treated with a release coating, the adhesive remains substantially on the surface with no penetration therein and is preferably in a somewhat tacky condition. In combining the drafted fiber web 94 with the adhesively printed belt it is desirable to feed the belt 96 around roll 108 at a speed slightly in excess of the delivery speed of the final pair of rolls 92 of draw frame 90. By so doing, the web 94 is maintained under slight tension so that the individual highly-drafted fibers are retained in their aligned and tensioned condition and the resulting bonded web has maximum strength. Thus, the web 94 emerging from the draw frame 90 is deposited on the tacky adhesive 102 on belt 96 and held in tension engagement therewith by the adhesive.

Following deposit of the web 94 onto the adhesively printed belt, a spot bonded, airlaid web 110 formed as described with respect to FIG. 6 is unwound from a roll 112 and is brought together with the adhesive fiber web on belt 96 at the squeeze roll 113. The resulting laminate is then drawn around the heated curing drum 114 where solidification and/or fusing of the adhesive is substantially completed while the airlaid web 110 and the drawn web 94 are maintained in firm contact to bond the respective layers together. To insure adequate ply attachment, it is desirable that travel of the combined belt and laminate be around a substantial portion of the drum 114. A fly roll 116 can be suitably positioned to apply tension to the combined belt and laminate to enhance the lamination.

After leaving the fly roll 116, the laminate and belt are preferably passed over the drive roll 118, which can also serve as a cooling drum to set the adhesive. The laminate can then be easily stripped from the release-coated surface of the belt 96 by a guide roll 120 as the laminate leaves the cooling drum 118.

Using apparatus such as illustrated in FIG. 9, a specific drafted fiber web-cellulosic web laminate of the following construction can be readily prepared.

Drafted fiber web: Staple length rayon fibers—Web basis wt. of 5 grams./yd.$^2$

Cellulosic web: Spot bonded, airlaid web prepared as described in Example I—Web basis wt. of 20 lbs./2880 ft.$^2$ Adhesive: Plastisol identified in Example II with less mineral spirits—application viscosity 2,000 cps.—applied in previously identified preferred diamond pattern in amount of 9 grms./yd.$^2$ The following laminating conditions can be employed:

Belt 96: Woven glass with tetrafluoroethylene release coating
Drum 114 temperature: 300° F.
Dwell time on drum 114: about 5 sec.
Squeeze roll 113 pressure: about 30 p.s.i.

After preparation as above-described the laminate is microcreped in the manner illustrated with respect to FIG. 1.

The resulting microcreped laminate possesses the very desirable characteristics of drape and softness exhibited by the laminate prepared according to the Example II procedure. In addition, the drafted fibrous web improves surface abrasion resistance while at the same time being quite soft in texture. The illustrated microcreped laminate is suitable for use in textile applications such as garments and sheeting, particularly where the necessity for high cross-direction strength is not especially important.

EXAMPLE IV

This example illustrates the preparation of a soft, drapeable laminate having a scrim material on one side, a spot bonded, airlaid cellulosic web as an inner ply, and a drafted fiber web on the other side. The outer plies provide abrasion resistant laminate surfaces with the scrim material also contributing a desirable degree of cross-directional strength to the product. The presence of the distinctive inner cellulosic ply provides laminate bulk, softness, and absorbency, which characteristics are remarkably accentuated on compressive deformation of the laminate.

The laminate can be prepared by first preparing a two ply drafted web-cellulosic web laminate by the FIG. 9 procedure illustrated in Example III, uniting this laminate with a scrim material in the manner discussed in Example II with respect to FIG. 8 (the cellulosic web 78 and the printing station 72 are not employed and the two ply laminate is used in place of the web 76), and thereafter microcreping the three ply composite. Useful laminating conditions are as follows:

Preparation of two-ply laminate: As in Example III.
Preparation of three-ply laminate:

Scrim: nylon threads of 30 denier—6 per inch in machine direction, 70 denier-5 per inch in cross-direction
Adhesive: Plastisol (100 parts vinyl chloride polymer, 60 parts dioctyl phthalate plasticizer, 25 parts mineral spirits); application viscosity 600 cps.; applied in amount of about 6 grms./yd.$^2$ to side of scrim.
Squeeze roll pressure: 40 p.l.i.
Roll 84 temperature: 350° F.
Laminate dwell time on roll 84: about 1 sec.

The remaining examples illustrate the preparation of especially preferred products within the scope of the present invention. In their broadest aspects, these products comprise compressively deformed laminates of a spot bonded airlaid cellulosic web and a web comprised of substantially randomly deposited and continuous thermoplastic filaments. Such products possess truly outstanding fabric-like characteristics. The effect of compressive deformation is especially apparent when the continuous filament web itself has been autogenously prebonded prior to the time at which the laminate is formed.

Continuous filament webs useful herein are generally well known and are described in a variety of patents including the following: U.S. Pats. 3,338,992; 3,341,394; 3,276,944; 3,502,538; 3,502,763; 3,542,615; and Canadian Pat. 803,714. In general the webs are prepared by continuously extruding a polymer through a spinneret, drawing the spun filaments, and thereafter depositing the drawn filaments onto a continuously moving surface in a substantially random fashion. Drawing serves to give the polymer filaments tenacity, while substantially random deposition gives the web desirable isotropic strength characteristics.

For use herein, lightweight continuous filament webs having a basis weight of about 0.3 to about 1 oz. per square yard are ordinarily employed though higher basis weight webs, e.g., up to a basis weight of about 3 oz. per square yard, can also be used. Ordinarily, the polymer filaments of the web have a denier of about 0.5–6. The thermoplastic polymer used in preparing the continuous filament webs is not particularly critical with respect to realizing the advantages of the present invention so long as it is spinnable. Due to its cost, predominantly isotactic polypropylene is preferred; however, other polymers such as other polyolefins, e.g., polyethylene, polyisobutylene, polybutadiene, etc. polyurethanes, polyvinyls, polyamides and polyesters can also be used. Mixtures of such polymers and copolymers prepared from monomers used in preparing the polymers are useful as well.

While lamination with the spot bonded airlaid web according to the present invention can be accomplished with the continuous filament web in its unbonded form, it is generally desirable to bond the web into a stable structure prior to lamination. Such bonding increases the strength of the resulting laminate and additionally enhances the abrasion resistance of the web, a particularly desirable feature when the continuous filament web forms a surface layer of the laminate. Autogenous bonding whereby the filaments in the web are secured together under the action of heat and pressure is customarily employed for web stabilization. A useful method for such bonding is disclosed in copending Hansen and Pennings application entitled, "Pattern Bonded Continuous Filament Web," Ser. No. 121,880, filed Mar. 8, 1971, abandoned in favor of Ser. No. 177,077, filed Sept. 1, 1971. Webs bonded according to the technique illustrated therein contain an intermittent pattern of autogenous bond areas distributed substantially uniformly throughout the continuous filament web. The total bond area of the web is about 5–50% with the density of the individual bond being about 50–3200 per square inch, the higher bond densities being employed with the higher total bonded areas. Webs so bonded possess a desirable combination of "hand" and tensile strength. As disclosed in the aforementioned application, such bonded webs can be prepared by passing an unbonded continuous filament web through a pressure nip formed between a smooth hard roll and a heated patterned roll containing a plurality of raised points. Continuous filament web-cellulosic laminates possessing very desirable energy absorbing characteristics are described in copending application Ser. No. 126,530, filed on Mar. 22, 1971, now abandoned in favor of Ser. No. 228,349, filed Feb. 22, 1972.

EXAMPLE V

A laminate of a continuous filament web and a spot bonded airlaid cellulosic web can be conveniently prepared using the apparatus depicted in FIG. 10. In its basic aspects, the apparatus therein disclosed is quite similar to the apparatus shown in FIG. 9 except that adhesive printing is directly accomplished on the continuous filament web 122 unwound from the roll 124, there being no necessity for including an independent conveyor sheet. The illustrated printing station 126 and the heated curing drum 128 function in substantially the same manner as previously described with respect to the FIG. 9 embodiment.

Referring again to FIG. 10, laminate formation is accomplished by printing adhesive on the continuous filament web 122 by passing the web through the nip formed between the printing roll 130 and the back-up roll 132, and then bringing the spot bonded airlaid cellulosic web 134 into contact with the adhesively printed surface of the web 122 at the heated drum 128. The dwell time of the laminate on the heated drum 128 as well as the tension applied thereto must be sufficient to cure the adhesive and effectuate ply attachment by forcing the adhesive in the selected print pattern to encapsulate the continuous filament webs and penetrate into the cellulosic wadding web. After lamination has been effected, the laminate can be compressively deformed by means of microcreping using the apparatus illustrated in FIG. 1.

Using apparatus such as depicted in FIGS. 1 and 10, a compressively deformed continuous filament web-cellulosic web laminate can be prepared as follows:

Lamination

Continuous filament web 122: Polypropylene filaments having a denier of about 1.5–2; web basis weight of about 0.5 oz./yd.$^2$; bonded with an intermittent pattern of autogenous spot bonds in a density of about 200/in.$^2$ and occupying 18% of the web area.

Cellulosic web: As described in Example I with basis weight of 14 lbs./2880 ft.$^2$ Adhesive printing station 126: Same as Example III.

Drum 128 temperature: 300° F.

Dwell time on drum 128: about 5 sec.

The laminate prepared as above-described is extremely fabric-like in feed and texture. It is believed that not only does the illustrated compressive deformation act on the airlaid cellulosic web in a manner which accentuates bulk and softness but additionally that the compressive deformation "works" on the continuous filament web in a manner which increases its overall softness and bulk. However, it should be noted that the surface of the continuous filament web is quite abrasion resistant, a fact which indicates that the increased softness and bulkiness of the laminate is not principally due to the breakage of the autogenous spot bonds in the continuous filament web. A particularly surprising feature of such microcreped continuous filament web laminates is the absence of a visual surface microcrepe structure after creping and the fact that the cross-directional drape charcteristics are not adversely affected by the creping operation.

By using the basic procedure described in Example V, laminates of continuous filament webs and airlaid cellulosic webs which contain more than just the illustrated two plies can be readily prepared. For example, by replacing the continuous filament web 122 with a continuous filament web-cellulosic web laminate formed by the Example V procedure and printing the adhesive on the filament side of the laminate a three-ply laminate containing outer cellulosic web plies and an inner continuous filament web can be prepared. Similarly, by replacing the web 134 with the two-ply laminate and bringing the cellulosic web surface into contact with the adhesively printed surface of the web 122, a three-ply laminate having outer continuous filament webs and an inner cellulosic web can be prepared.

What is claimed is:

1. A soft, bulky cellulosic laminate comprising an airlaid web of cellulosic fibers containing a pattern of highly compacted spot-bonded areas spaced apart from one another a distance less than an average fiber length, and fluffy mounds of substantially unbonded fibers disposed between said bonded areas, said web being united to at least one network of reinforcing elements with a layer of patterned adhesive containing open areas of a magnitude at least several times greater than the spacing between adjacent spot-bonded areas in said web, said laminate being compressively deformed to enhance the softness and bulkiness thereof by accentuating the fluffy characteristics of said mounds of substantially unbonded fibers disposed within the open areas of said patterned adhesive layer.

2. The cellulosic laminate of claim 1 wherein compressive deformation is achieved by microcreping.

3. The laminate of claim 2 wherein said network of reinforcing elements comprises a nonwoven scrim.

4. The laminate of claim 2 wherein said network of reinforcing elements comprises a web of drafted fibers.

5. The laminate of claim 2 wherein said network of reinforcing elements comprises a web of substantially randomly deposited and continuous filaments of a thermoplastic polymer.

6. The laminate of claim 3 wherein said nonwoven scrim is disposed between outer plies of said airlaid webs.

7. The laminate of claim 2 wherein said airlaid web has a network of reinforcing elements united to either side thereof.

8. The laminate of claim 7 wherein one of said networks comprises a nonwoven scrim and the other of said networks comprises a web of drafted fibers.

9. The laminate of claim 7 wherein the networks comprise webs of substantially randomly deposited and continuous filaments of a thermopalstic polymer.

10. A process for preparing a soft, bulky cellulosic product comprising forming a laminate by uniting an airlaid web of cellulosic fiber containing a pattern of highly compacted spot-bonded areas which are spaced apart from one another a distance less than an average fiber length and fluffy mounds of substantially unbonded fibers disposed between said bonded areas to at least one network of reinforcing elements with a layer of patterned adhesive containing open areas of a magnitude at least several times greater than the spacing between adjacent spot-bonded areas in said web, and, thereafter, compressively deforming said laminate to enhance the softness and bulkiness thereof by accentuating the fluffy characteristics of said mounds of substantially unbonded fibers disposed within the open areas of said patterned adhesive layer.

11. The process of claim 10 wherein the laminate is compressively deformed by microcreping.

12. A soft, bulky cellulosic laminate comprising a lightweight airlaid web comprising a continuum of randomlaid cellulosic fibers having a length of less than about 0.5 inch, the continuum being interrupted by a pattern of highly compacted spot-bonded areas spaced apart from one another a distance less than about an average fiber length and the web fibers in other areas forming substantially unbonded fluffy mounds, said web being united to at least one network of reinforcing elements with a layer of patterned adhesive containing open areas of a magnitude at least several times greater than the spacing between adjacent spot-bonded areas in said web, said laminate being compressively deformed to enhance the softness and bulkiness thereof by accentuating the fluffy characteristics of said mounds of substantially unbonded fibers disposed within the open areas of said patterned adhesive layer.

References Cited

UNITED STATES PATENTS

| | | | |
|---|---|---|---|
| 2,902,395 | 9/1959 | Hirschy et al. | 156—219 |
| 3,017,304 | 1/1962 | Burgeni | 161—145 |
| 3,597,299 | 8/1971 | Thomas et al. | 161—129 |
| 3,327,708 | 6/1967 | Sokolowski | 161—128 |
| 3,546,056 | 4/1968 | Thomas | 161—129 |
| 3,424,643 | 1/1969 | Lewis, Jr. et al. | 161—129 |

GEORGE F. LESMES, Primary Examiner

J. J. BELL, Assistant Examiner

U.S. Cl. X.R.

156—628, 209, 219, 290, 553; 161—124, 129, 141, 148, 150, 156; 264—119